(12) United States Patent
Li et al.

(10) Patent No.: US 11,569,758 B2
(45) Date of Patent: Jan. 31, 2023

(54) CONTROL SYSTEM WITH DELAYED PROTECTION FOR A THREE-LEVEL INVERTER

(71) Applicant: TEXAS INSTRUMENTS INCORPORATED, Dallas, TX (US)

(72) Inventors: Longgi Li, Shenzhen (CN); Wanling Zhang, Shenzhen (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 58 days.

(21) Appl. No.: 17/340,645

(22) Filed: Jun. 7, 2021

(65) Prior Publication Data

US 2021/0384844 A1 Dec. 9, 2021

Related U.S. Application Data

(60) Provisional application No. 63/035,875, filed on Jun. 8, 2020.

(51) Int. Cl.
| | |
|---|---|
| *H02H 3/027* | (2006.01) |
| *H02M 7/537* | (2006.01) |
| *H02M 7/487* | (2007.01) |
| *H02H 3/02* | (2006.01) |
| *H02H 3/033* | (2006.01) |
| *H02H 7/122* | (2006.01) |

(52) U.S. Cl.
CPC ............ *H02M 7/537* (2013.01); *H02H 3/021* (2013.01); *H02H 3/027* (2013.01); *H02H 3/033* (2013.01); *H02H 7/1227* (2013.01); *H02M 7/487* (2013.01); *H02H 7/122* (2013.01)

(58) Field of Classification Search
CPC ........ H02H 3/021; H02H 3/027; H02H 3/033; H02H 7/122; H02H 7/1227; H02M 7/487; H02M 7/537
See application file for complete search history.

(56) References Cited

U.S. PATENT DOCUMENTS

| | | | |
|---|---|---|---|
| 2012/0057387 A1* | 3/2012 | Lai .................. | H03K 17/567 327/434 |
| 2013/0229843 A1* | 9/2013 | Takatsuka .......... | H02M 1/44 363/97 |
| 2015/0222202 A1* | 8/2015 | Cyr .................. | H03K 17/567 327/432 |

* cited by examiner

*Primary Examiner* — Gary L Laxton
(74) *Attorney, Agent, or Firm* — Krista Y. Chan; Frank D. Cimino

(57) ABSTRACT

A microcontroller unit for controlling a three-level inverter including delayed fault protection is provided. The microcontroller unit includes an input port configured to receive a trip signal from a fault detection module, and a plurality of EPWM modules, each configured to control a power switch within the three-level inverter. The microcontroller unit includes an auxiliary EPWM module configured to receive the trip signal and produce a delayed trip signal, and processing circuitry coupled with the input port, the plurality of EPWM modules, and the auxiliary EPWM module. The processing circuitry is configured to, in response to activation of the trip signal, direct one of the plurality of EPWM modules to shut off its corresponding power switch upon activation of the trip signal, and to direct a different one of the plurality of EPWM modules to shut off its corresponding power switch upon activation of the delayed trip signal.

20 Claims, 7 Drawing Sheets

CONTROL SYSTEM WITH DELAYED PROTECTION FOR A THREE-LEVEL INVERTER

RELATED APPLICATIONS

This application hereby claims the benefit of and priority to U.S. Provisional Patent Application No. 63/035,875, titled "TECHNIQUES FOR ACHIEVING DELAYED PROTECTION FOR THREE-LEVEL INVERTER", filed on Jun. 8, 2020 and which is hereby incorporated by reference in its entirety.

TECHNICAL BACKGROUND

Three-level inverter topology has become increasingly popular in high power applications, such as uninterruptible power supplies (UPS) and solar inverters. By increasing the bus voltage within these devices to 1000V or 1500V DC, the current is reduced while maintaining the same power levels, which significantly reduces the power loss with less copper design. Also, three-level inverter topology makes it possible to use the same switching device to support much higher voltage stress than traditional two-level inverters. FIG. 1 illustrates a typical single-phase three-level I-type inverter, called a neutral point clamped (NPC) inverter. In many embodiments, three of these single-phase inverters are used to generate a three-phase alternating current (AC) output.

This example single-phase NPC inverter module 100 includes four power switches, Q1 111, Q2 112, Q3 113, and Q4 114, such as Insulated-Gate Bipolar Transistors (IGBTs), in series. First switch Q1 111 and fourth switch Q4 114 are called outer switches, and second switch Q2 112 and third switch Q3 113 are called inner switches. Power switches Q1 111, Q2, 112, Q3 113, and Q4 114 are controlled by signals S1 151, S2 152, S3 153, and S4 154 respectively. The DC link is split in two symmetric halves connected in series.

Inverter module 100 also includes bus voltage supply 105 providing a voltage of VIN to the inverter. Protective diodes D1 121, D2 122, D3 123, and D4 124 are provided across power switches Q1-Q4 111-114 respectively. Neutral point input N is received at node 101, while output AC is provided at node 102. Inverter module 100 further includes capacitors C1 131 and C2 132, along with diodes D5 125 and D6 126, which provide filtering.

During normal operation Q1 111 switches opposite to Q3 113, while Q2 112 switches opposite to Q4 114. There is an interlock with deadtime between Q1 111 and Q3 113, as well as between Q2 112 and Q4 114, preventing a shoot-through condition. Q1 111 and Q4 114 are not allowed to be activated simultaneously.

During normal operation while providing AC power and coupled to a power grid, the switching states of the power switches Q1-Q4 111-114 are illustrated below in Table 1.

TABLE 1

| | Switching states | | | |
|---|---|---|---|---|
| | Q1 | Q2 | Q3 | Q4 |
| Positive cycle of the AC | Alternate switch | Remains ON | Alternate switch | Remains OFF |
| Negative cycle of the AC | Remains OFF | Alternate switch | Remains ON | Alternate switch |

As illustrated in Table 1, during the positive portion of the AC cycle, Q1 111 and Q3 113 are alternatively switching, while Q2 112 remains on and Q4 114 remains off. During the negative portion of the AC cycle, Q2 112 and Q4 114 are alternatively switching, while Q1 111 remains off and Q3 113 remains on.

Compared to a traditional two-level inverter, three-level inverters require more complicated power conversion control (as illustrated by Table 1), and also require more complicated fault protection logic. Events such as over current, over voltage, short circuit, thermal overload, and the like, trigger rapid shut downs of the three-level inverter in order to protect the power switches and the system or grid itself.

In two-level inverters, during shut down, all of the power switches are switched off immediately and simultaneously. However, three-level inverters require a specific shut down and recovery sequence for protection of the power switches and other circuitry. In three-level inverters, during shut down, outer switches Q1 111 and Q4 114 must be shut off before inner switches Q2 112 and Q3 113, which are shut off after a specific delay. Typically, outer switches Q1 111 and Q4 114 are immediately shut off when a fault or trip event is detected. Then, after a specific delay, during a positive portion of the AC cycle Q2 112 is shut down, or during a negative portion of the AC cycle Q3 113 is shut down.

During the recovery process, inner switches Q2 112 and Q3 113 must be activated before outer switches Q1 111 and Q4 114 in order to prevent energy stored in inductor L1 141 from causing a large voltage overshoot and potentially damaging the power switches.

This delayed protection requirement of three-level inverters has been a challenge for designers of UPS and solar energy systems. Software methods include excessive delay and therefore are unable to provide real-time protection. Current hardware methods include the use of external hardware circuits, such as Field-Programmable Gate Arrays (FPGAs), Complex Programmable Logic Devices (CPLDs), and the like to provide the required shut off and recovery sequences. An example prior art hardware method is illustrated in FIG. 2 and described in detail below. However, these designs increase system cost and development effort.

OVERVIEW

In an implementation, a microcontroller unit for controlling a three-level inverter including delayed fault protection is provided. The microcontroller unit includes an input port configured to receive a trip signal from a fault detection module, and a plurality of Enhanced Pulse Width Modulation (EPWM) modules, each configured to control a power switch within the three-level inverter.

The microcontroller unit also includes an auxiliary EPWM module configured to receive the trip signal and produce a delayed trip signal, and processing circuitry coupled with the input port, the plurality of EPWM modules, and the auxiliary EPWM module.

The processing circuitry is configured to, in response to activation of the trip signal, direct one of the plurality of EPWM modules to shut off its corresponding power switch upon activation of the trip signal, and to direct a different one of the plurality of EPWM modules to shut off its corresponding power switch upon activation of the delayed trip signal.

In another implementation, a method for controlling a three-level inverter including delayed fault protection with a microcontroller unit is provided. The method includes receiving a trip signal from a fault detection module at an input port within the microcontroller unit, and controlling a plurality of power switches within the three-level inverter via a plurality of Enhanced Pulse Width Modulation (EPWM) modules within the microcontroller unit, each configured to control one of the power switches within the three-level inverter.

The method also includes producing a delayed trip signal from the trip signal via an auxiliary EPWM module within the microcontroller unit, and in response to activation of the trip signal, directing one of the plurality of EPWM modules to shut off its corresponding power switch upon activation of the trip signal, and directing a different one of the plurality of EPWM modules to shut off its corresponding power switch upon activation of the delayed trip signal.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
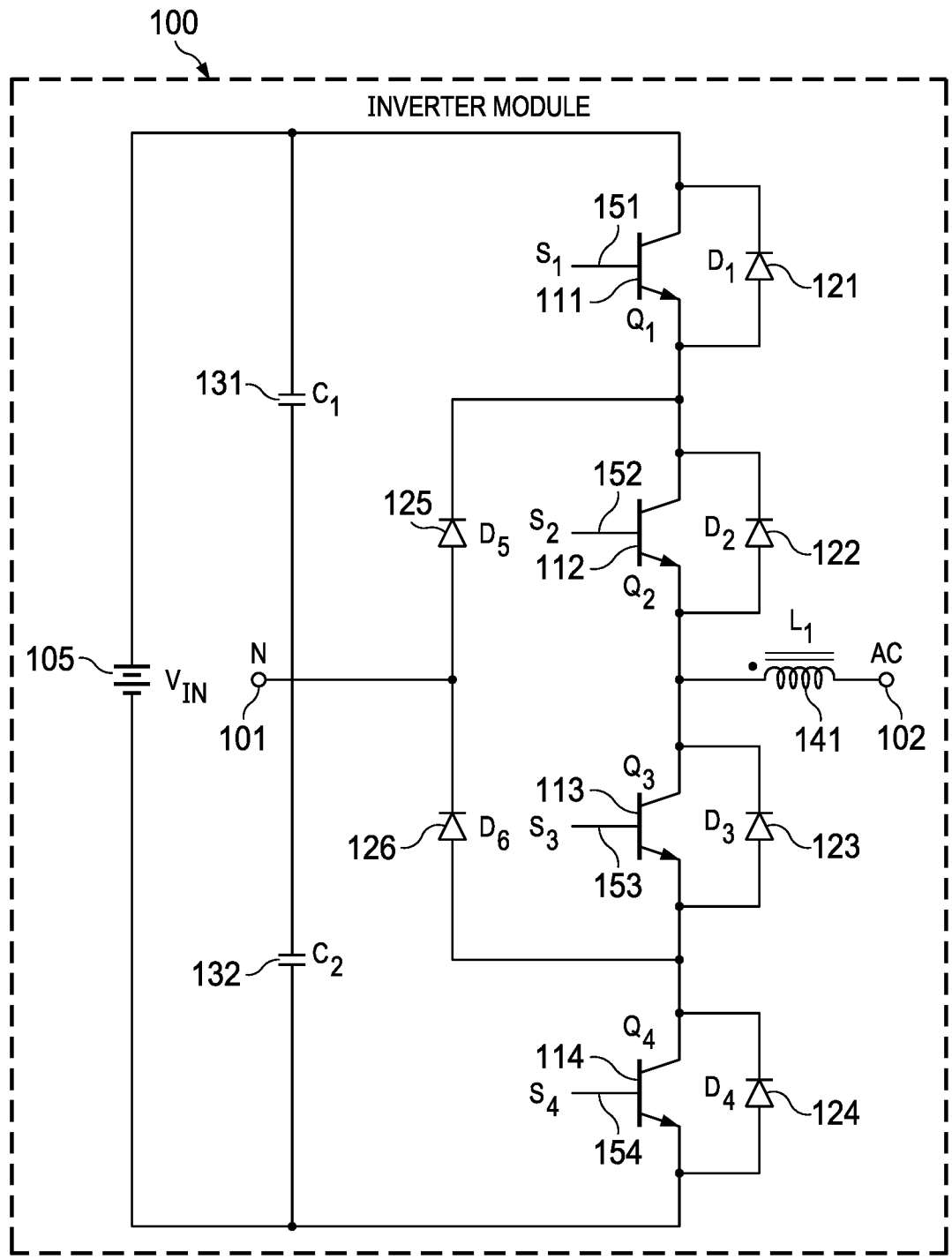
FIG. 1 illustrates an example embodiment of a single-phase three-level I-type inverter module.

FIG. 1 illustrates an example embodiment of a single-phase three-level I-type inverter module 100 and was described in detail above. Note that while FIG. 1 illustrates a single-phase three-level I-Type inverter, called a neutral point clamped (NPC) inverter, other embodiments use any of a wide variety of three-level inverter designs and configurations, all within the scope of the present invention.

Figure 2:
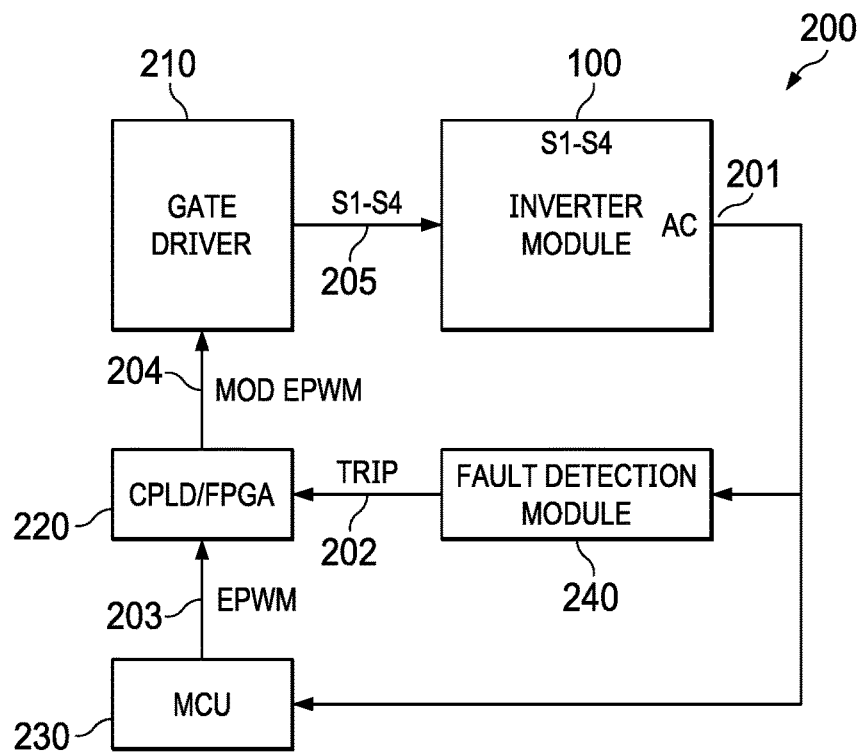
FIG. 2 illustrates an example embodiment of a prior art system for providing shut down and recovery sequences to a three-level inverter module.

FIG. 2 illustrates an example embodiment of a prior art hardware system 200 for providing shut off and recovery sequences to a three-level inverter module 100. In this example embodiment, a three-level inverter module 100 such as inverter module 100 from FIG. 1 is controlled by microcontroller unit (MCU) 230 and provides an AC output 201. Gate Driver 210 provides power switch control signals S1-S4 205 to inverter module 100. microcontroller unit (MCU) 230 provides Enhanced Pulse Width Modulation (EPWM) signals 203 to CPLD/FPGA 220, which modifies the EPWM signals 203 to include the necessary sequencing of the shut down and restoration of inverter module 100 when a fault is detected. The modified EPWM signals 204 are provided to gate driver 210.

Fault detection module 240 monitors AC output 201 to detect faults such as over current, over voltage, short circuit, thermal overload, and the like. When a fault is detected, fault detection module provides trip or fault signal 202 to CPLD/FPGA 220 which then modifies the EPWM signals 203 to include the necessary sequencing of the shut down and restoration of inverter module 100. In addition to the cost of the CPLD/FPGA, the CPLD/FPGA requires VHDL (VHSIC (Very High-Speed Integrated Circuits) Hardware Description Language) or Verilog to configure its logic primitives. This in turn requires additional software development efforts and resources to create and maintain the additional coding.

Figure 3:
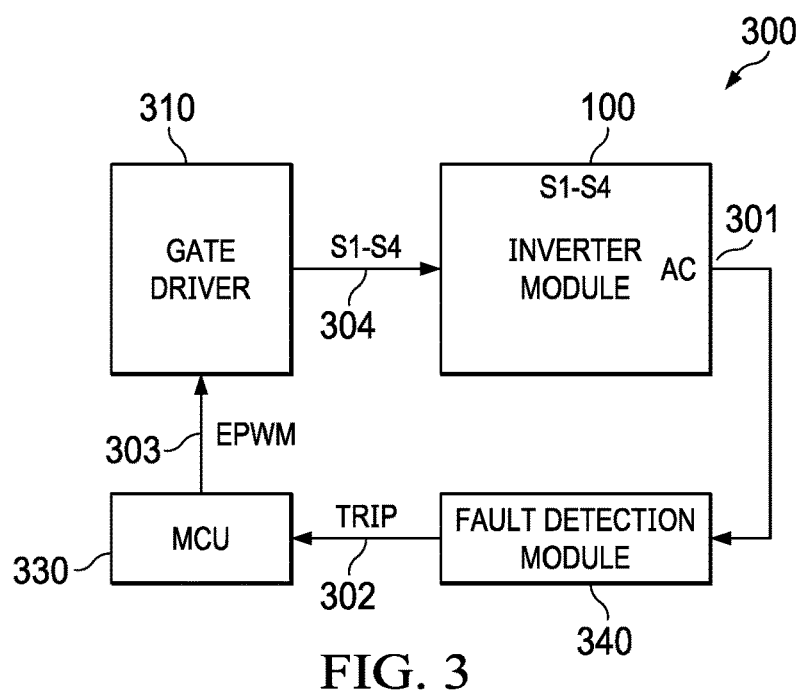
FIG. 3 illustrates an example embodiment of a system for providing shut down and recovery sequences to a three-level inverter module.

FIG. 3 illustrates an example embodiment of a system 300 for providing shut down and recovery sequences to a three-level inverter module. In this example embodiment of the present invention, MCU 330 is configured to respond to a trip or fault signal 302 by modifying its EPWM signals to include the necessary sequencing of the shut down and restoration of inverter module 100 when a fault is detected. One example configuration of MCU 330 including this protection is illustrated in FIG. 4 and described in detail below.

In this example embodiment, a three-level inverter module 100 such as inverter module 100 from FIG. 1 is controlled by microcontroller unit (MCU) 330 and provides an AC output voltage 301. Gate driver 310 provides power switch control signals S1-S4 304 to inverter module 100. microcontroller unit (MCU) 330 provides Enhanced Pulse Width Modulation (EPWM) signals 303 to gate driver 310.

Fault detection module 340 monitors AC output 301 to detect faults such as over current, over voltage, short circuit, thermal overload, and the like. When a fault is detected, fault detection module provides trip signal 302 to MCU 330 which then modifies the EPWM signals 303 to include the necessary sequencing for the shut down and restoration of inverter module 100.

Figure 4:
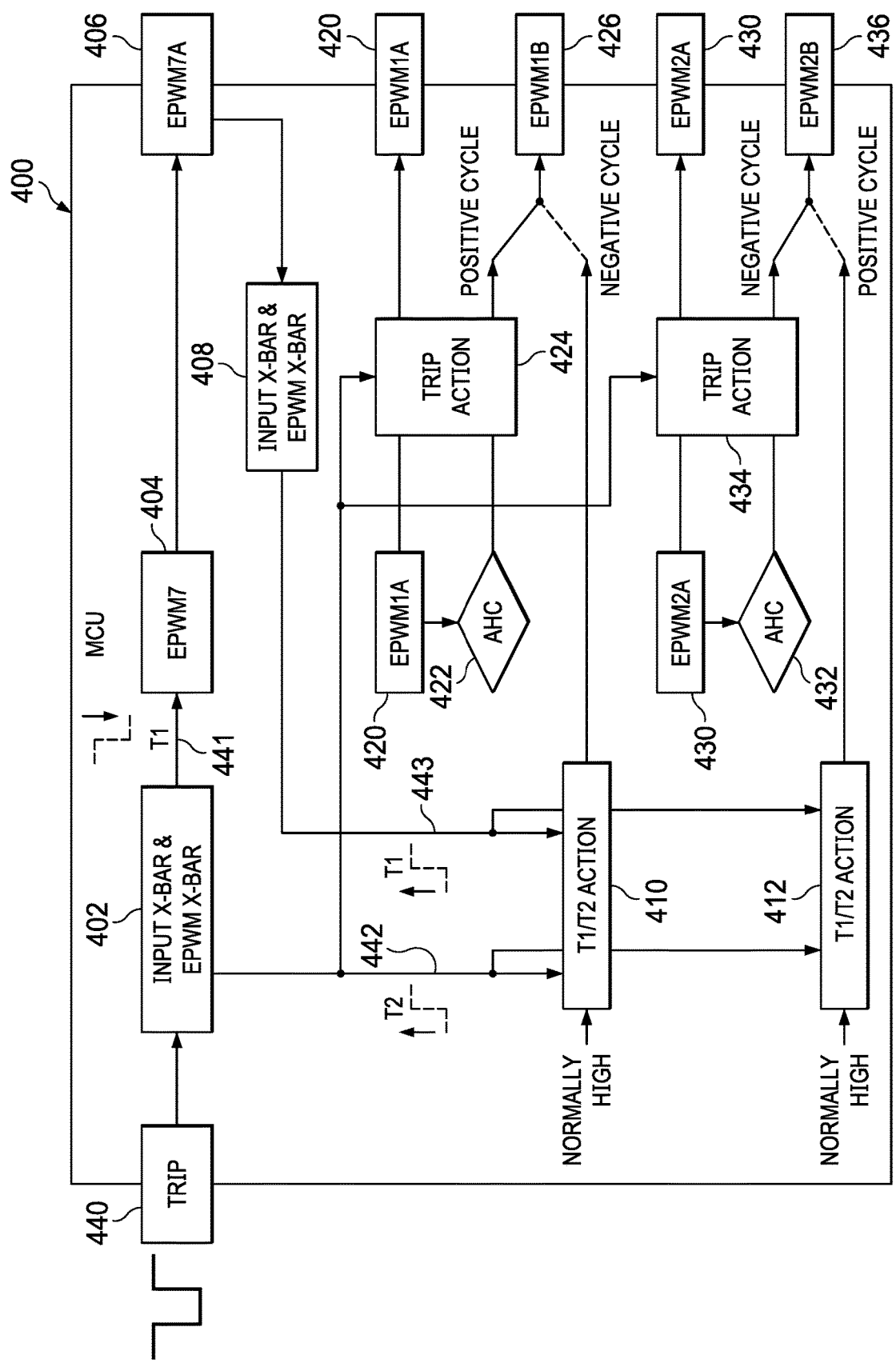
FIG. 4 illustrates an example embodiment of a microcontroller unit configured to provide shut down and recovery sequences to a three-level inverter module.

FIG. 4 illustrates an example embodiment of a microcontroller unit 400 configured to provide shut down and recovery sequences to a three-level inverter module 100. In this example embodiment of the present invention, a MCU 400 such as MCU 330 from FIG. 3 is configured to provide the necessary sequencing of the shut down and restoration of three-level inverters, such as inverter module 100 from FIG. 1. In one example embodiment, MCU 400 comprises a C2000™ series microcontroller unit from Texas Instruments Inc. Other embodiments use other microcontroller units all within the scope of the present invention.

In this example, MCU 400 includes multiple Type 4 Enhanced Pulse Width Modulator (EPWM) modules including EPWM1A 420, EPWM1B 426, EPWM2A 430, EPWM2B 436, EPWM7 404, and EPWM7A 406. EPWM1A 420 and EPWM1B 426 are channels within EPWM module EPWM1. EPWM2A 430 and EPWM2B 436 are channels within EPWM module EPWM2. Each EPWM module includes a time-base counter triggered by a clock signal, and each EPWM module is configurable to generate different outputs according to desired events. For example, when the time-base counter equals the value within a counter-comparator register.

EPWM modules EPWM1A 420, EPWM1B 426, EPWM2A 430, and EPWM2B 436 produce four pulse width modulated signals that are provided to a gate driver such as gate driver 310 from FIG. 3, which in turn provides signals S1-S4 304 to drive the four power switches within inverter module 100. In this example embodiment, EPWM1A 420 produces a signal which is used to control power switch Q1 111 within inverter module 100, EPWM1B 426 produces a signal which is used to control power switch Q3 113 within inverter module 100, EPWM2A 430 produces a signal which is used to control power switch Q4 114 within inverter module 100, and EPWM2B 436 produces a signal which is used to control power switch Q2 112 within inverter module 100.

Figure 7:
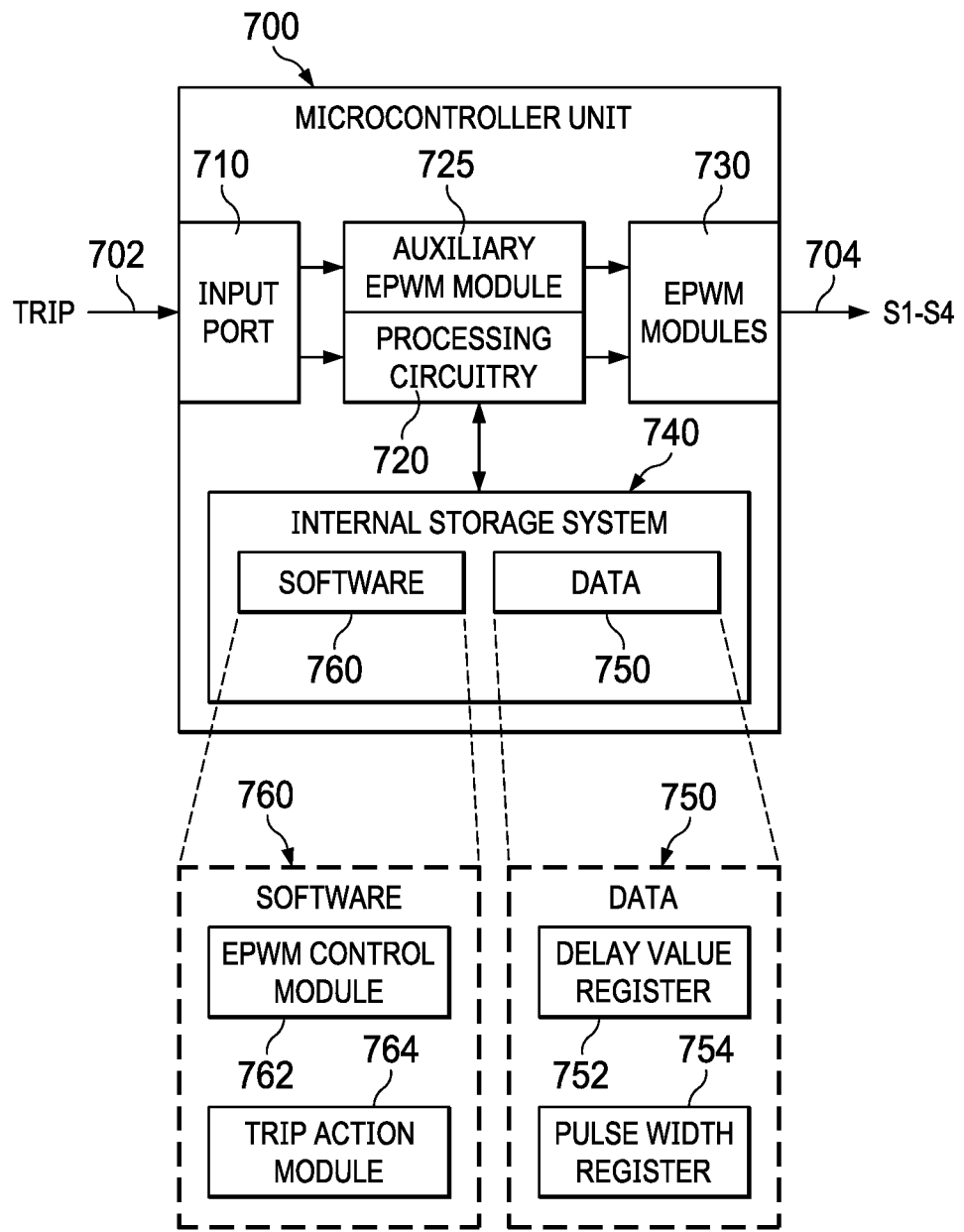
FIG. 7 illustrates an example embodiment of a microcontroller unit 700 for controlling a three-level inverter including delayed fault protection.

EPWM modules EPWM7 404 and EPWM7A 406 comprise an auxiliary EPWM channel which is used to produce delayed signals for use during the necessary sequencing of the shut down and restoration of inverter module 100. EPWM7A 406 is one channel of the EPWM modules EPWM7 404. In an example embodiment, the desired delay is configurable via a register within EPWM7 404, such as illustrated in FIG. 7 and described below.

In this example, trip signal 302 from FIG. 3 is provided as trip input 440 to a trip (input) port of MCU 400. The trip signal is active low in this example. The trip signal 440 passes through crossbar 402 which routes it to various other modules within MCU 400. In this example, when trip signal 440 falls (or is activated) this is called a T1 event. When trip signal 440 rises (or is de-activated for recovery) this is called a T2 event.

During a T1 event, the falling trip signal 441 is processed by EPWM module EPWM7 404 and crossbar 408 to produce a delayed trip signal 443, using a dead-band module within EPWM7 404, which is then provided to the other EPWM modules for use in generating delayed shut off signals to the inner power switches within inverter module 100. Crossbars 402 and 408 route signals internally and reduce external signal connections.

Trip signal 442 and delayed trip signal 443 are provided to T1/T2 Action Modules 410 and 412 which then provide appropriate trip signals to EPWM modules EPWM1A 420, EPWM1B 426, EPWM2A 430, and EPWM2B 436.

Since the grid-tied inverter needs to take care of the control during both positive and negative cycles of the AC current, EPWM1B 426 and EPWM2B 436 need to be reconfigured at the zero-cross point of the cycles. During the positive cycle, EPWM1B 426 and EPWM2B 436 should be active high complementary (AHC) to EPWM1A 420 and EPWM2A 430 respectively. This is accomplished by dead-band modules within EPWM1 and EPWM2.

During the negative portion of the AC cycle, EPWM1B 426 and EPWM2B 436 should be sourced from a normally high signal configured with actions from the T1 and T2 events. This is accomplished by T1/T2 Action modules 410 and 412 respectively.

Trip action modules 424 and 434 are configured to control the EPWM modules using the trip signal 442 as necessary to turn off the power switches within inverter module 100 in the desired sequence to prevent damage during a fault or trip event.

While this example embodiment illustrates the operation of MCU 400 to control a single three-level inverter, other embodiments use additional EPWM modules to control multiple three-level inverters, such as used in three-phase power inverter topologies. In such a configuration, EPWM7A 406 produces delayed trip signals for use by the other EPWM modules.

In this example embodiment, the on-chip signal crossbars 402 and 408 enable the routing of any general-purpose input/output (GPIO) signal to operate as any of the dedicated EPWM trip signals. For example, the external fault or trip signal, which comes from the external current/voltage sensing circuit (fault detection module 340) is coupled to a GPIO within MCU 400 as the trip source, and it may also be coupled to one or more of the on-chip crossbars. In other example embodiments, the trip source is flexibly selected from an internal comparator output.

In other example embodiments, trip events of type T1 or T2, sourcing from comparator, trip, or sync events, also generate actions through an action qualifier submodule inside the EPWM modules, allowing for dead-band insertion of trip events.

Figure 5:
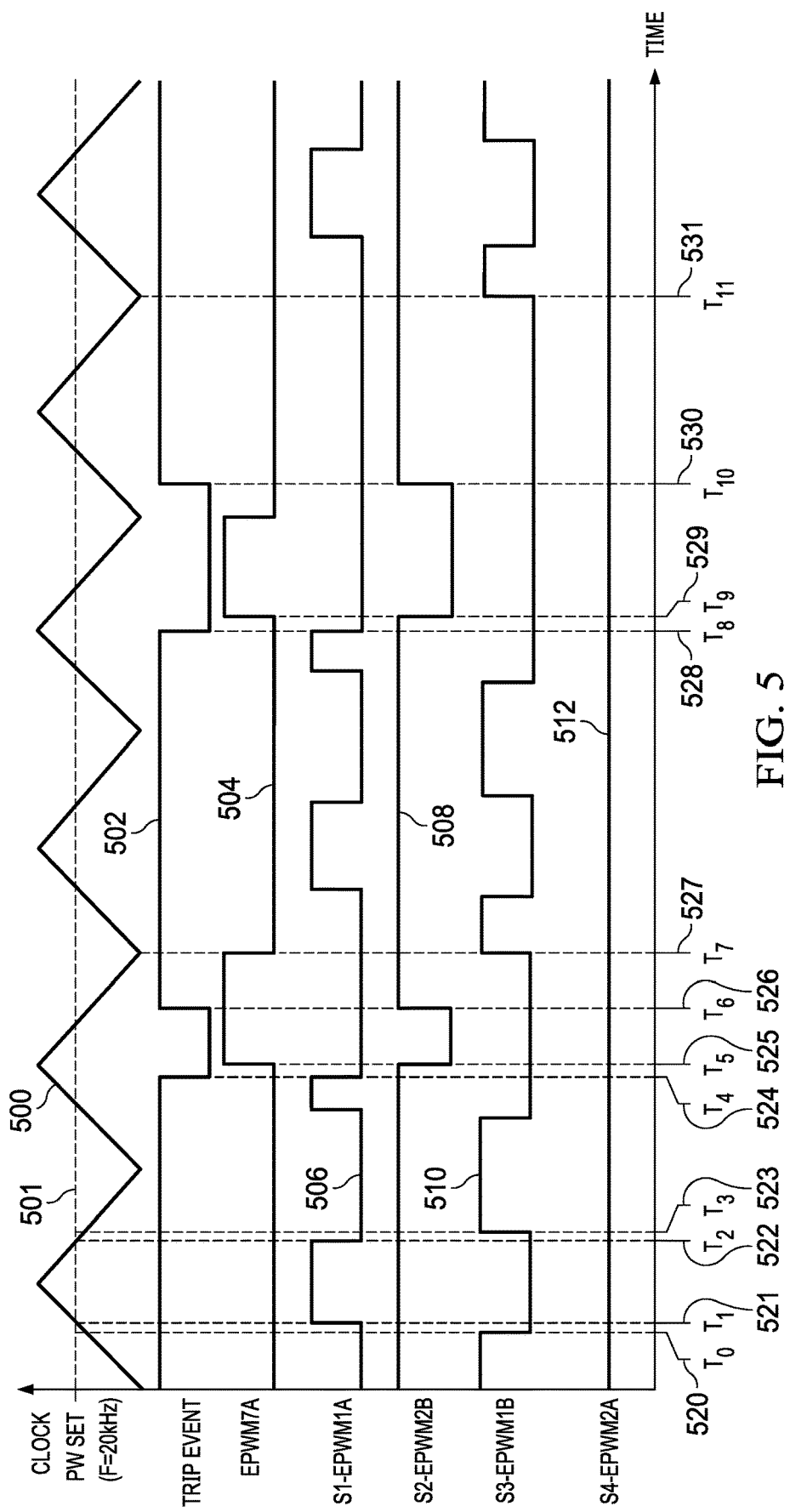
FIG. 5 illustrates an example timing diagram of a microcontroller unit configured to provide shut down and recovery sequences to a three-level inverter module during a positive portion of the AC power cycle.

FIG. 5 illustrates an example timing diagram of a microcontroller unit configured to provide shut down and recovery sequences to a three-level inverter module during a positive portion of the AC power cycle.

In this example embodiment, various signals within MCU 400 from FIG. 4 are illustrated during a positive portion of the AC power cycle. Clock 500 in this example is a 20 kHz triangle wave signal provided to the EPWM modules within MCU 400. PW set 501 is used by the EPWM modules to set the pulse width of their outputs. In this example, PW set 501 is stored in a register, such as that illustrated in FIG. 7 and described below. When the clock signal 500 crosses the value of PW set 501 one or more of the EPWM modules is activated or deactivated.

This timing diagram includes trip event signal 502 and the outputs of EPWM modules EPWM7A 406, EPWM1A 420, EPWM1B 426, EPWM2A 430, and EPWM2B 436 from FIG. 4.

During the positive portion of the AC power cycle, within inverter module 100, first switch Q1 111 and third switch Q3 113 are alternatively switching, while second switch Q2 112 remains on and fourth switch Q4 114 remains off. As described above, the output of EPWM1A 420 produces signal S1 151 which controls first power switch Q1 111, the output of EPWM1B 426 produces signal S3 153 which controls third power switch Q3 113, the output of EPWM2A 430 produces signal S4 154 which controls fourth power switch Q4 114, and the output of EPWM2B 436 produces signal S2 152 which controls second power switch Q2 112.

Thus, during the positive portion of the AC power cycle, the outputs of EPWM1A 420 and EPWM1B 426 are alternatively switching (while remaining non-overlapping), the output of EPWM2B 436 remains high, and the output of EPWM2A 430 remains low. This normal operation is illustrated at times $T_0$ 520, $T_1$ 521, $T_2$ 522, and $T_3$ 523 of the timing diagram. Note that the output of EPWM1B 426 transitions low at time $T_0$ 520 before the output of EPWM1A 420 transitions high at time $T_1$ 521, and the output of EPWM1A 420 transitions low at time $T_2$ 522 before the output of EPWM1B 426 transitions high at time $T_3$ 523, thus providing non-overlapping signals.

Trip event signal 502 is active low. When a fault or T1 type trip event occurs at time $T_4$ 524, the output of EPWM1A 420 immediately transitions low, shutting off outer power switch Q1 111. EPWM7A 406 provides a delayed trip signal (active high) at time $T_5$ 525, which causes the output of EPWM2B 436 to transition low, shutting off inner power switch Q2 112. Since the outputs of EPWM1B 426 and EPWM2A 430 are already low at time $T_4$ 524 they do not need to change.

At time $T_6$ 526, the trip event signal 502 is de-activated (T2 type trip event) and recovery of inverter module 100 begins. The output of EPWM2B 436 immediately transitions high, turning on inner power switch Q2 112, and at the beginning of the next clock cycle at time $T_7$ 527 normal operation of the EPWM modules resumes.

During some faults or trip events, the fault may remain over more than a single clock cycle. This situation is illustrated in the timing diagram at times $T_8$ 528, $T_9$ 529, and $T_{10}$ 530. When a fault or T1 type trip event occurs at time $T_8$ 528, the output of EPWM1A 420 immediately transitions low shutting off outer power switch Q1 111. EPWM7A 406 provides a delayed trip signal (active high) at time $T_9$ 529, which causes the output of EPWM2B 436 to transition low shutting off inner power switch Q2 112. Since the outputs of EPWM1B 426 and EPWM2A 430 are already low at time $T_8$ 528 they do not need to change.

At time $T_{10}$ 530, the trip event signal 502 is de-activated (T2 type trip event) and recovery of inverter module 100 begins. The output of EPWM2B 436 immediately transitions high turning on inner power switch Q2 112, and at the beginning of the next clock cycle at time $T_{11}$ 531 normal operation of the EPWM modules resumes.

Figure 6:
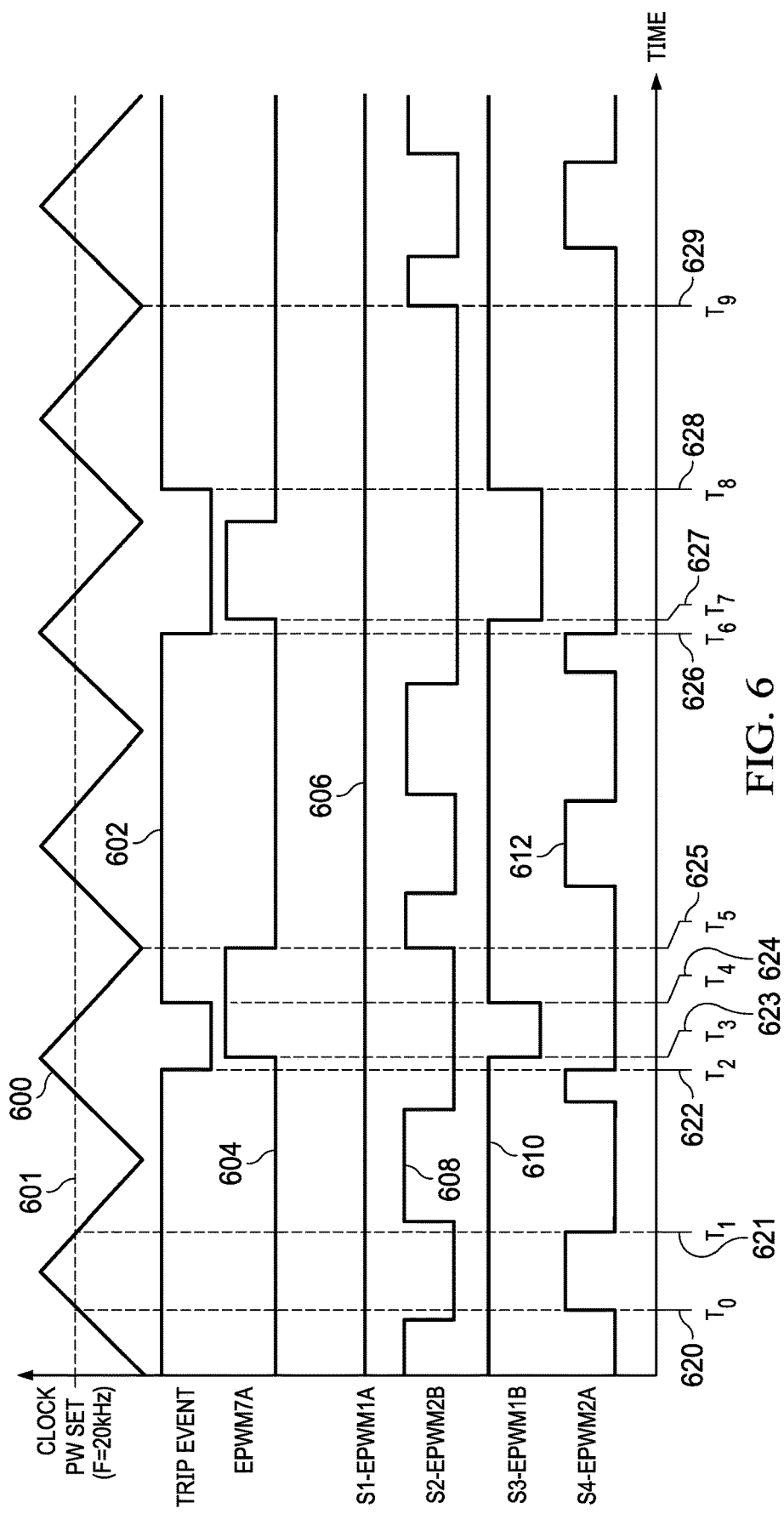
FIG. 6 illustrates an example timing diagram of a microcontroller unit configured to provide shut down and recovery sequences to a three-level inverter module during a negative portion of the AC power cycle.

FIG. 6 illustrates an example timing diagram of a microcontroller unit configured to provide shut down and recovery sequences to a three-level inverter module during a negative portion of the AC power cycle.

In this example embodiment, various signals within MCU 400 from FIG. 4 are illustrated during a positive portion of the AC power cycle. Clock 600 in this example is a 20 kHz triangle wave signal provided to the EPWM modules within MCU 400. PW set 601 is used by the EPWM modules to set the pulse width of their outputs. In this example, PW set 601 is stored in a register. When the clock signal 600 crosses the value of PW set 601 one or more of the EPWM modules is activated or de-activated.

This timing diagram includes trip event signal 502 and the outputs of EPWM modules EPWM7A 406, EPWM1A 420, EPWM1B 426, EPWM2A 430, and EPWM2B 436 from FIG. 4.

During the negative portion of the AC power cycle, within inverter module 100, second switch Q2 112 and fourth switch Q4 114 are alternatively switching, while third switch Q3 113 remains on and first switch Q1 111 remains off. As described above, the output of EPWM1A 420 produces signal S1 151 which controls first power switch Q1 111, the output of EPWM1B 426 produces signal S3 153 which controls third power switch Q3 113, the output of EPWM2A 430 produces signal S4 154 which controls fourth power switch Q4 114, and the output of EPWM2B 436 produces signal S2 152 which controls second power switch Q2 112.

Thus, during the negative portion of the AC power cycle, the outputs of EPWM2A 430 and EPWM2B 436 are alternatively switching (while remaining non-overlapping), the output of EPWM1B 426 remains high, and the output of EPWM1A 420 remains low. This normal operation is illustrated at times $T_0$ 620, and $T_1$ 621 of the timing diagram. Note that the output of EPWM2B 436 transitions low before the output of EPWM2A 430 transitions high, and the output of EPWM2A 430 transitions low before the output of EPWM2B 436 transitions high, thus providing non-overlapping signals.

Trip event signal 602 is active low. When a fault or T1 type trip event occurs at time $T_2$ 622, the output of EPWM2A 430 immediately transitions low, shutting off outer power switch Q4 114. EPWM7A 406 provides a delayed trip signal (active high) at time $T_3$ 623, which causes the output of EPWM1B 426 to transition low, shutting off inner power switch Q3 113. Since the outputs of EPWM2B 436 and EPWM1A 420 are already low at time $T_2$ 622 they do not need to change.

At time $T_4$ 624, the trip event signal 602 is de-activated (T2 type trip event) and recovery of inverter module 100 begins. The output of EPWM1B 426 immediately transitions high, turning on inner power switch Q3 113, and at the beginning of the next clock cycle at time $T_5$ 625 normal operation of the EPWM modules resumes.

During some faults or trip events, the fault may remain over more than a single clock cycle. This situation is illustrated in the timing diagram at times $T_6$ 626, $T_7$ 627, and $T_8$ 628. When a fault or $T_1$ type trip event occurs at time $T_6$ 626, the output of EPWM2A 430 immediately transitions low, shutting off outer power switch Q4 114. EPWM7A 406 provides a delayed trip signal (active high) at time $T_7$ 627, which causes the output of EPWM1B 426 to transition low, shutting off inner power switch Q3 113. Since the outputs of EPWM2B 436 and EPWM1A 420 are already low at time $T_6$ 628 they do not need to change.

At time $T_8$ 628, the trip event signal 602 is de-activated (T2 type trip event) and recovery of inverter module 100 begins. The output of EPWM1B 426 immediately transitions high, turning on inner power switch Q3 113, and at the beginning of the next clock cycle at time $T_9$ 629 normal operation of the EPWM modules resumes.

FIG. 7 illustrates an example embodiment of a microcontroller unit 700 for controlling a three-level inverter including delayed fault protection. As discussed above, microcontroller unit 700 may take on any of a wide variety of configurations. Here, a simplified example configuration is provided for a microcontroller unit 400 as illustrated in greater detail in FIG. 4 and described above.

In this example embodiment, microcontroller unit 700 comprises input port 710, processing circuitry 720, auxiliary EPWM module 725, EPWM modules 730, and internal storage system 740. Input port 710 comprises circuitry configured to receive a trip or fault signal from a fault detection module such as fault detection module 340 from FIG. 3. EPWM modules 730 comprise a plurality of EPWM modules each configured to control a power switch within the three-level inverter. Auxiliary EPWM module 725 is configured to receive the trip signal 702 from input port 710 and to produce a delayed trip signal for use by processing circuitry 720 and EPWM modules 730. The trip delay is stored within delay value register 752.

Processing circuitry 720 comprises electronic circuitry configured to direct microcontroller unit 700 to control a three-level inverter 100 including delayed fault protection as described above. Processing circuitry 720 may comprise microprocessors and other circuitry that retrieves and executes software 760. Examples of processing circuitry 720 include general purpose central processing units, application specific processors, and logic devices, as well as any other type of processing device, combinations, or variations thereof. Processing circuitry 720 can be implemented within a single processing device but can also be distributed across multiple processing devices or sub-systems that cooperate in executing program instructions.

Internal storage system 740 can comprise any non-transitory computer readable storage media capable of storing software 760 that is executable by processing circuitry 720. Internal storage system 720 can also include various data structures 750 which comprise one or more registers, databases, tables, lists, or other data structures. Storage system 740 can include volatile and nonvolatile, removable and non-removable media implemented in any method or technology for storage of information, such as computer readable instructions, data structures, program modules, or other data. In this example embodiment, internal storage system 740 includes registers within the EPWM modules and flash memory within microcontroller unit 700 which also stores configuration codes and instructions.

Storage system 740 can be implemented as a single storage device but can also be implemented across multiple storage devices or sub-systems co-located or distributed relative to each other. Storage system 740 can comprise additional elements, such as a controller, capable of communicating with processing circuitry 720. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 760 can be implemented in program instructions and among other functions can, when executed by microcontroller unit 700 in general or processing circuitry 720 in particular, direct microcontroller unit 700, or processing circuitry 720, to operate as described herein to control a three-level inverter 100 including delayed fault protection. Software 760 can include additional processes, programs, or components, such as operating system software, database software, or application software. Software 760 can also comprise firmware or some other form of machine-readable processing instructions executable by elements of processing circuitry 720.

In at least one example implementation, the program instructions include EPWM control module 762, and trip action module 764. EPWM control module 762 provides instructions to processing circuitry 720 for use in directing the plurality of EPWM modules 730 to each control a power switch within the three-level inverter. Trip action module 764 provides instructions to processing circuitry 720 for use in directing auxiliary EPWM module 725 to produce a delayed trip signal and to control EPWM modules 730 during a trip event.

In an example embodiment, data 750 includes delay value register 752 that stores a delay value used by auxiliary EPWM module 725 to produce the delayed trip signal. Data 750 also includes pulse width register 754 that stores one or more pulse width values used by EPWM modules 730 to set the width of their pulses.

In general, software 760 can, when loaded into processing circuitry 720 and executed, transform processing circuitry 720 overall from a general-purpose computing system into a special-purpose computing system customized to operate as described herein for a microcontroller unit 700 configured to control a three-level inverter 100 including delayed fault protection, among other operations. Encoding software 760 on internal storage system 740 can transform the physical structure of internal storage system 740. The specific transformation of the physical structure can depend on various factors in different implementations of this description. Examples of such factors can include, but are not limited to the technology used to implement the storage media of internal storage system 740 and whether the computer-storage media are characterized as primary or secondary storage.

For example, if the computer-storage media are implemented as semiconductor-based memory, software 760 can transform the physical state of the semiconductor memory when the program is encoded therein. For example, software 760 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 8:
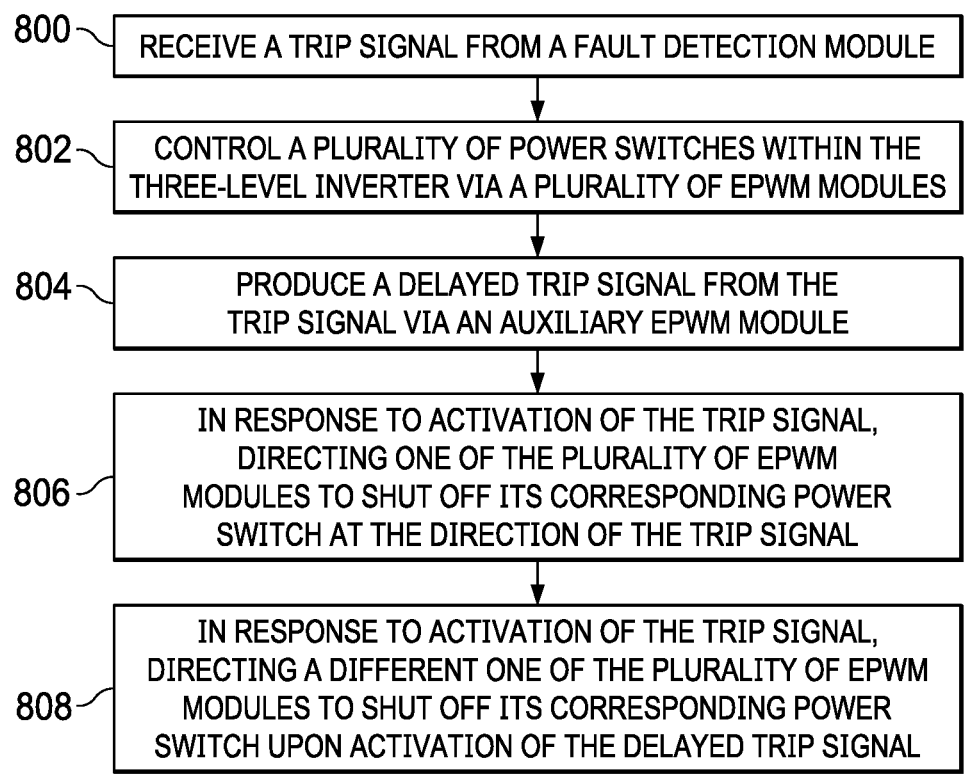
FIG. 8 illustrates an example flow chart of a method for operating a microcontroller unit configured to provide shut down and recovery sequences to a three-level inverter module.

FIG. 8 illustrates an example flow chart of a method for operating a microcontroller unit 700 configured to provide shut down and recovery sequences to a three-level inverter module 100.

In this example method, microcontroller unit 700 receives a trip signal from a fault detection module at an input port within the microcontroller unit 700, (operation 800). Processing circuitry 720 within microcontroller unit 700 controls a plurality of power switches 111-114 within the three-level inverter 100 via a plurality of Enhanced Pulse Width Modulation (EPWM) modules 730 within the microcontroller unit 700, each configured to control one of the power switches within the three-level inverter 100, (operation 802).

Auxiliary EPWM module 725 within microcontroller unit 700 produces a delayed trip signal from the trip signal, (operation 804). In response to activation of the trip signal 702, processing circuitry 720 directs one of the plurality of EPWM modules 730 to shut off its corresponding power switch upon activation of the trip signal 702, (operation 806). Also in response to activation of the trip signal 702, processing circuitry 720 directs a different one of the plurality of EPWM modules to shut off its corresponding power switch upon activation of the delayed trip signal, (operation 808).

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A microcontroller unit for controlling a three-level inverter including delayed fault protection, the microcontroller unit comprising:
    an input port configured to receive a trip signal from a fault detection module;
    a plurality of Enhanced Pulse Width Modulation (EPWM) modules each configured to control a power switch within the three-level inverter;
    an auxiliary EPWM module configured to receive the trip signal and produce a delayed trip signal; and
    processing circuitry coupled with the input port, the plurality of EPWM modules, and the auxiliary EPWM module configured to, in response to activation of the trip signal, direct one of the plurality of EPWM modules to shut off its corresponding power switch upon activation of the trip signal, and to direct a different one of the plurality of EPWM modules to shut off its corresponding power switch upon activation of the delayed trip signal.

2. The microcontroller unit of claim 1, wherein the one of the plurality of EPWM modules directed to shut off its corresponding power switch upon activation of the trip signal controls an outer power switch within the three-level inverter, and the different one of the plurality of EPWM modules directed to shut off its corresponding power switch upon activation of the delayed trip signal controls an inner power switch within the three-level inverter.

3. The microcontroller unit of claim 1, wherein the auxiliary EPWM module includes a register configured to store a delay amount.

4. The microcontroller unit of claim 1, wherein:
the three-level inverter comprises first, second, third, and fourth power switches and produces an alternating current (AC) cycle output;
the plurality of EPWM modules comprises a first EPWM module having a first output configured to control the first power switch, a second EPWM module having a second output configured to control the second power switch, a third EPWM module having a third output configured to control the third power switch, and a fourth EPWM module having a fourth output configured to control the fourth power switch;
the first and fourth power switches are outer power switches; and
the second and third power switches are inner power switches.

5. The microcontroller unit of claim 4, wherein:
when the trip signal is activated during a positive portion of the AC cycle, the processing circuitry directs the first EPWM module to shut off the first power switch upon activation of the trip signal, and directs the second EPWM module to shut off the second power switch upon activation of the delayed trip signal; and
when the trip signal is activated during a negative portion of the AC cycle, the processing circuitry directs the fourth EPWM module to shut off the fourth power switch upon activation of the trip signal, and directs the third EPWM module to shut off the third power switch upon activation of the delayed trip signal.

6. The microcontroller unit of claim 4, wherein:
when the trip signal is de-activated during a positive portion of the AC cycle, the processing circuitry directs the second EPWM module to turn on the second power switch upon activation of the trip signal, and directs the first EPWM module to turn on the first power switch during a subsequent clock cycle; and
when the trip signal is de-activated during a negative portion of the AC cycle, the processing circuitry directs the third EPWM module to turn on the third power switch upon activation of the trip signal, and directs the fourth EPWM module to turn on the fourth power switch during a subsequent clock cycle.

7. The microcontroller unit of claim 4, wherein:
during a positive portion of the AC cycle, the third EPWM module is active high complementary to the first EPWM module, and the second EPWM module is sourced from a normally high signal configured with the trip signal.

8. The microcontroller unit of claim 4, wherein:
during a negative portion of the AC cycle, the second EPWM module is active high complementary to the fourth EPWM module, and the third EPWM module is sourced from a normally high signal configured with the trip signal.

9. The microcontroller unit of claim 1, wherein the EPWM modules are Type 4 EPWM modules.

10. The microcontroller unit of claim 1, wherein the microcontroller unit is configured to control a three-phase three-level inverter power module.

11. A method for controlling a three-level inverter including delayed fault protection with a microcontroller unit, the method comprising:
receiving a trip signal from a fault detection module at an input port within the microcontroller unit;
controlling a plurality of power switches within the three-level inverter via a plurality of Enhanced Pulse Width Modulation (EPWM) modules within the microcontroller unit, each configured to control one of the power switches within the three-level inverter;
producing a delayed trip signal from the trip signal via an auxiliary EPWM module within the microcontroller unit; and
in response to activation of the trip signal, directing one of the plurality of EPWM modules to shut off its corresponding power switch upon activation of the trip signal, and directing a different one of the plurality of EPWM modules to shut off its corresponding power switch upon activation of the delayed trip signal.

12. The method of claim 11, wherein the one of the plurality of EPWM modules directed to shut off its corresponding power switch upon activation of the trip signal controls an outer power switch within the three-level inverter, and the different one of the plurality of EPWM modules directed to shut off its corresponding power switch upon activation of the delayed trip signal controls an inner power switch within the three-level inverter.

13. The method of claim 11, wherein the auxiliary EPWM module includes a register configured to store a delay amount.

14. The method of claim 11, wherein:
the three-level inverter comprises first, second, third, and fourth power switches and produces an alternating current (AC) cycle output;
the plurality of EPWM modules comprises a first EPWM module having a first output configured to control the first power switch, a second EPWM module having a second output configured to control the second power switch, a third EPWM module having a third output configured to control the third power switch, and a fourth EPWM module having a fourth output configured to control the fourth power switch;
the first and fourth power switches are outer power switches; and
the second and third power switches are inner power switches.

15. The method of claim 14, further comprising:
when the trip signal is activated during a positive portion of the AC cycle, shutting off the first power switch via the first EPWM module upon activation of the trip signal, and shutting off the second power switch via the second EPWM module upon activation of the delayed trip signal; and
when the trip signal is activated during a negative portion of the AC cycle, shutting off the fourth power switch via the fourth EPWM module upon activation of the trip signal, and shutting off the third power switch via the third EPWM upon activation of the delayed trip signal.

16. The method of claim 14, further comprising:
when the trip signal is de-activated during a positive portion of the AC cycle, turning on the second power switch via the second EPWM module upon activation of the trip signal, and turning on the first power switch via the first EPWM module during a subsequent clock cycle; and
when the trip signal is de-activated during a negative portion of the AC cycle, turning on the third power switch via the third EPWM module upon activation of the trip signal, and turning on the fourth power switch via the fourth EPWM module during a subsequent clock cycle.

17. The method of claim 14, further comprising:
during a positive portion of the AC cycle, controlling the third EPWM module to be active high complementary to the first EPWM module, and the second EPWM module to be sourced from a normally high signal configured with the trip signal.

18. The method of claim 14, further comprising:
during a negative portion of the AC cycle, controlling the second EPWM module to be active high complementary to the fourth EPWM module, and third EPWM module to be sourced from a normally high signal configured with the trip signal.

19. The method of claim 11, wherein the EPWM modules are Type 4 EPWM modules.

20. The method of claim 11, wherein the microcontroller unit is configured to control a three-phase three-level inverter power module.

* * * * *